US009335225B2

(12) United States Patent
Xu et al.

(10) Patent No.: US 9,335,225 B2
(45) Date of Patent: May 10, 2016

(54) DEFORMATION SENSOR PACKAGE AND METHOD

(71) Applicant: Measurement Specialties, Inc., Hampton, VA (US)

(72) Inventors: Han Xu, Aliso Viejo, CA (US); Anthony S. Chu, Laguna Niguel, CA (US); Barry A. Singer, Granada Hills, CA (US)

(73) Assignee: Measurement Specialties, Inc., Hampton, VA (US)

( * ) Notice: Subject to any disclaimer, the term of this patent is extended or adjusted under 35 U.S.C. 154(b) by 236 days.

(21) Appl. No.: 14/071,131

(22) Filed: Nov. 4, 2013

(65) Prior Publication Data

US 2015/0122043 A1 May 7, 2015

(51) Int. Cl.
*G01L 1/00* (2006.01)
*G09B 23/32* (2006.01)
*G01B 5/30* (2006.01)
*G01L 5/00* (2006.01)

(52) U.S. Cl.
CPC . *G01L 1/005* (2013.01); *G01B 5/30* (2013.01); *G01L 5/0052* (2013.01); *G09B 23/32* (2013.01)

(58) Field of Classification Search
CPC ........ G09B 23/32; G09B 23/00; G09B 23/30; G01L 1/005; G01L 5/00; G01M 17/007; G01M 7/08; G01M 17/0078; G01B 5/30; A61B 5/103; A61B 2562/046; A61B 2562/0252; A61B 5/6823

USPC ................ 73/865.3, 865.6, 866.4, 862.046, 73/862.042, 767; 33/760, 764; 434/274
See application file for complete search history.

(56) References Cited

U.S. PATENT DOCUMENTS

| 4,409,835 | A | | 10/1983 | Daniel et al. |
| 5,236,144 | A | * | 8/1993 | Kautz ............................ 242/371 |
| 5,317,931 | A | * | 6/1994 | Kalami ........................ 73/866.4 |
| 2008/0072443 | A1 | | 3/2008 | Powell |
| 2011/0113561 | A1 | * | 5/2011 | Douglas ............................ 5/713 |

OTHER PUBLICATIONS

Rouhana, S., Elhagediab, A., Chapp, J., "A High-Speed Sensor for Measuring Chest Deflection in Crash Test Dummies", Proceedings of the 16th Technical Conference on the Enhanced Safety of Vehicles, Jun. 1998, pp. 2017-2045, Paper No. 98-S9-O-15.
International Search Report dated Mar. 3, 2015 for related application PCT/US2014/063933.
Written Opinion of the International Searching Authority dated Mar. 3, 2015 for related application PCT/US2014/063933.

* cited by examiner

*Primary Examiner* — Lisa Caputo
*Assistant Examiner* — Brandi N Hopkins
(74) *Attorney, Agent, or Firm* — Howard IP Law Group

(57) ABSTRACT

A deformation sensor package includes a housing having a base and a peripheral wall extending from the base. The base and peripheral wall define two cavities each configured to receive a potentiometer, such as a string potentiometer. The peripheral wall defines two apertures formed between a respective cavity and an exterior of the housing. Each aperture is configured to allow for the passage of a moveable sensing end of an associated potentiometer therethrough.

18 Claims, 5 Drawing Sheets

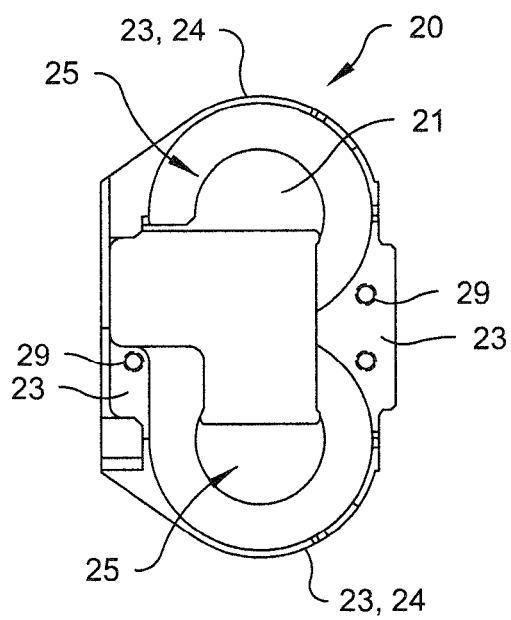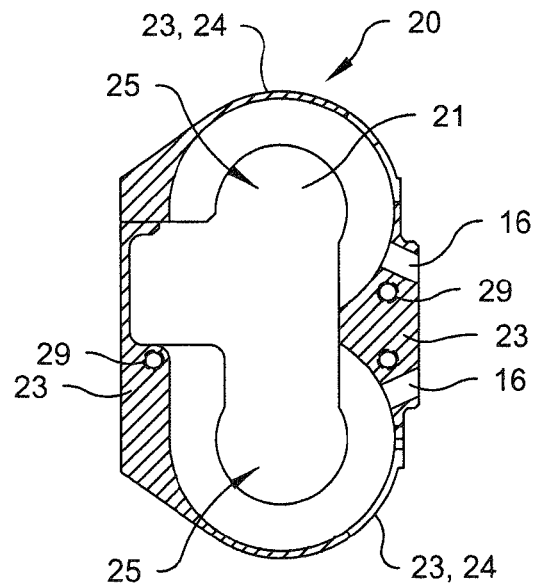
*Fig. 2A*  *Fig. 2B*
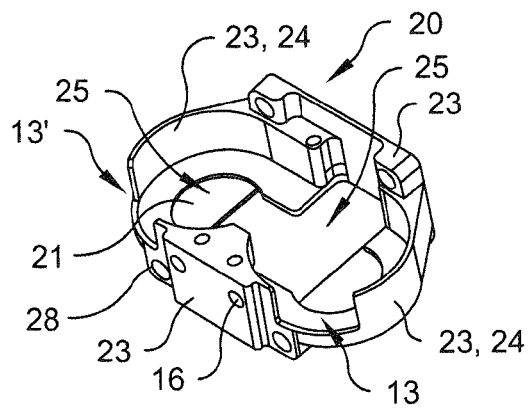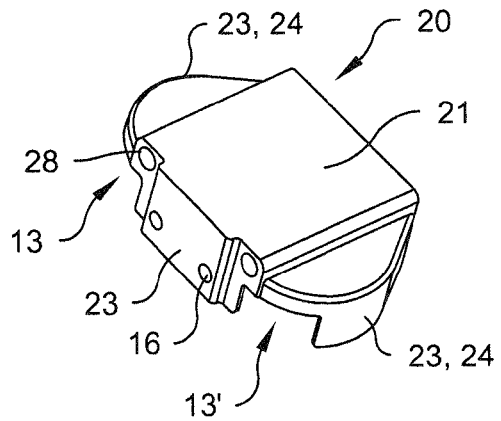
*Fig. 2C*  *Fig. 2D*

DEFORMATION SENSOR PACKAGE AND METHOD

FIELD OF THE INVENTION

The present disclosure relates generally to systems and methods for measuring deformation, and more specifically, to systems and methods for measuring two-dimensional deformation of objects such as component deformation during automotive crash testing.

BACKGROUND

Many applications require accurate, efficient and cost-effective systems for measuring movement, including measuring the deformation of an object. For example, automotive safety testing routinely utilizes anthropomorphic dummies (i.e. "crash test dummies") to evaluate potential damage to human passengers during automobile accidents. These tests include, by way of example, front, rear and side impact tests. In one particular application, the International Organization for Standardization (ISO) has developed a standard crash test dummy, the WorldSID (World Side Impact Dummy) for more accurately duplicating human motions and responses in side impact events. This dummy includes a standardized six-rib structure, and is specifically designed to provide for the accurate measurements of force, acceleration and displacement (e.g. chest/rib movement) during side impact testing.

Existing systems designed for measuring this movement or deformation lack the ability to track deformations at the very high acceleration rates produced as a result of crash testing. Other solutions, including those that measure two dimensional deformation by calculating linear and angular deformation separately, have improved accuracy, but are complex and prohibitively expensive. This cost is magnified as each dummy requires multiple sensors (e.g. one sensor for each rib).

Accordingly, improved systems and methods are desired for providing accurate, reliable and cost effective deformation measurements.

SUMMARY

In one embodiment of the present disclosure, a deformation sensor package is provided. The package includes a housing having a base and a peripheral wall extending from the base. The base and peripheral wall define two adjacent cavities each configured to receive a potentiometer, such as a string potentiometer. The peripheral wall defines two apertures formed between a respective cavity and an exterior of the housing. Each aperture is configured to allow for the passage of a moveable sensing end of an associated potentiometer therethrough.

In another embodiment of the present disclosure, a system for measuring the deformation of a rib of a crash test dummy is provided. The system includes a sensor package having a first string potentiometer and a second string potentiometer, with each potentiometer comprising a moveable sensing cable. The system further comprises a sensor support structure for positioning the first and second potentiometers at a given distance from a reference point. Each sensing cable of the first and the second string potentiometers is attached on a free end thereof to a common deformation measurement location on a given component (e.g. an artificial rib) of a crash test dummy.

In another embodiment of the present disclosure, a method for measuring the deformation of an object with respect to a reference point in at least two dimensions is provided. The method includes the steps of arranging first and second potentiometers at a given distance with respect to a reference point, attaching moveable sensing ends of the first and the second potentiometers to a common deformation measurement location on the object, and determining, in response to a force applied to the object, deformation of the deformation measurement location with respect to the reference point according to the output of the first and second potentiometers.

BRIEF DESCRIPTION OF THE DRAWINGS

FIG. 2A is a top view of an exemplary first housing portion of a sensor package housing according to an embodiment of the present disclosure.

FIG. 2B is a cross-sectional view of the exemplary sensor package housing portion of FIG. 2A.

FIG. 2C is a first perspective view of the exemplary sensor package housing portion of FIG. 2A.

FIG. 2D is a second perspective view of the exemplary sensor package housing portion of FIG. 2A.

DETAILED DESCRIPTION OF PREFERRED EMBODIMENTS

Figure 1:
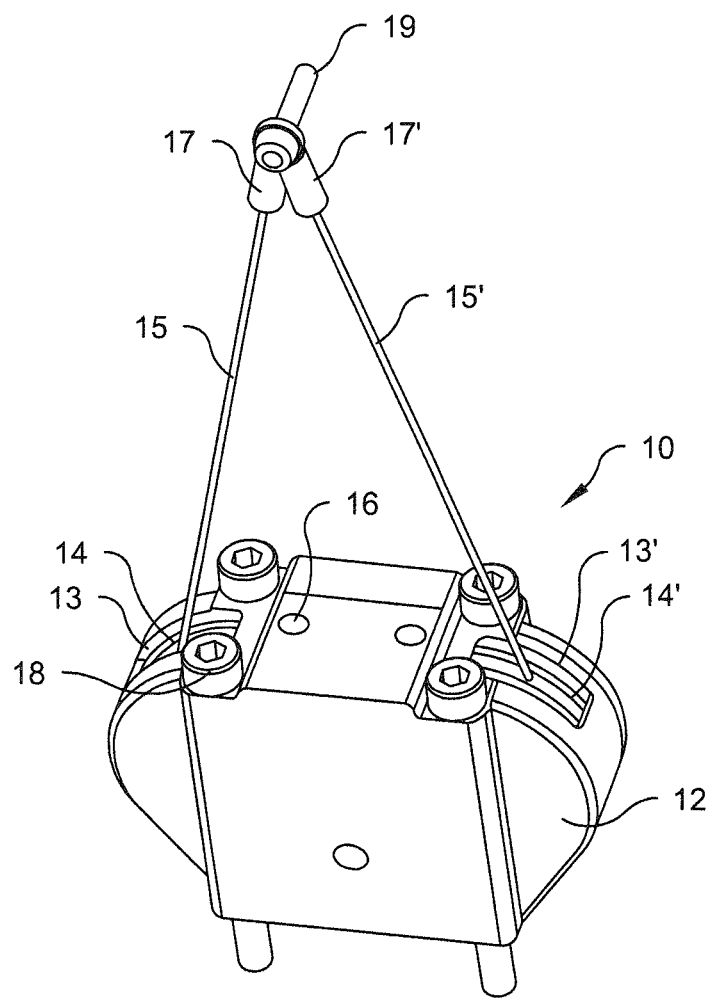
FIG. 1 is a perspective view of a deformation sensor package according to an embodiment of the present disclosure.

It is to be understood that the figures and descriptions of the present invention have been simplified to illustrate elements that are relevant for a clear understanding of the present invention, while eliminating, for purposes of clarity, many other elements found in transducer-based sensors, such as string potentiometers. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Existing solutions for measuring the deformation of an artificial rib of a crash test dummy have generally included a linear sensor element (e.g. an optical sensor) configured to measure linear translation or deformation along a single axis. More advanced, though expensive, systems provide provisions for measuring deformation in two dimensions by pivotally mounting the linear sensor element to a second sensor element, such as a rotary potentiometer for measuring any angular component of the deformation. These systems, in addition to being complicated and costly, have relatively high impedance, low linearity, high power consumption and inadequate sensing resolution compared to embodiments of the present disclosure. The low linearity and inadequate sensing resolution of these systems result from the physical and electrical limitations of the linear sensor elements (e.g. optical emitters and receivers). The high impedance and high power consumption of these systems are due to their complex internal optical to electrical conversion components. Embodiments of the present disclosure use two potentiometers as the sensing element that features simple resistance to electrical conversion components and improved characteristics of measuring the deformation.

Embodiments of the present disclosure include improved deformation sensors, sensor packages, and associated methods of calculating deformation in at least two dimensions. In one embodiment, a detection sensor package includes a sensor support structure configured to hold two potentiometers, such as two string potentiometers or cable-extension transducers. As will be understood by one of ordinary skill in the art, a string potentiometer is a transducer used to detect and measure linear position and velocity using a flexible string or cable and a spring-loaded spool. More specifically, string potentiometers generally comprise a measuring cable (e.g. stainless steel cable or wire), a spool, a spring, and a rotational sensor. Inside the housings of each of the potentiometers the cable is wound on the spool, which turns as the cable reels and unreels. To maintain cable tension, the spring is coupled to each spool. The spool may be coupled to the shaft of a rotational sensor (e.g. a potentiometer or rotary encoder). As the transducer's cable is tensioned and extends along with the movement of an object to which it is attached, the spool and sensor shaft are rotated. The rotating shaft creates an output electrical signal having a voltage proportional to the cable's linear extension and/or velocity.

The sensor support structure is configured to secure each of the potentiometers in a fixed position with respect to one another, and with respect to a reference point. In one embodiment, the sensor support structure comprises a housing, wherein the potentiometers are secured within the housing by, for example, one or more fasteners (e.g. set screws). The housing comprises an interior portion defining two cavities, with each cavity configured to accept a correspondingly-sized potentiometer. In one embodiment, the housing may comprise two apertures or openings formed through an exterior wall thereof, with each opening corresponding to the location of a sensing end of the potentiometer (e.g. corresponding to the location of a cable extending from a string potentiometer). As will be set forth in detail herein, the apertures may be sized such that the sensing end of the potentiometer may be articulated over a wide range of angles with respect to the housing and/or body of the potentiometer, without interfering therewith. In one embodiment, the housing is comprised of two portions or subcomponents, wherein the portions may be removably joined together to form the housing. In this way, potentiometers may be installed, accessed, or uninstalled by separating the housing portions.

Referring generally to FIG. 1, a sensor package 10 according to an embodiment of the present disclosure is shown. Sensor package 10 comprises a sensor support structure to which two potentiometers are securely mounted. In the illustrated embodiment, the sensor support structure is embodied as a housing 12 configured to hold two string potentiometers 14,14'. As described above, potentiometers 14,14' are operative to output a voltage indicative of the extension (or retraction) and/or velocity of associated respective sensing cables 15,15'. In one embodiment, by way of non-limiting example only, housing 12 comprises a metal housing, such as an aluminum housing. Potentiometers 14, 14' are securely contained within housing 12. This may be achieved by, for example, fastening potentiometers 14, 14' within housing 12 via fasteners (e.g. set screws) threaded through housing 12 via apertures 16. As illustrated, housing 12 features slot-like apertures 13, 13' formed through an exterior wall thereof for allowing the passage of sensing cables 15, 15' through a wall of housing 12. Housing 12 may be configured to be attached to, for example, testing equipment via one of more fasteners 18 passing through housing 12. As will be set forth in detail below, the free ends of sensing cables 15, 15' may be pivotally attached to a common deformation measuring point or location. This may be achieved by attaching associated cable ends 17, 17' of cables 15, 15' to a single fastener, such as a threaded bolt 19.

FIGS. 2A-3B illustrate an exemplary embodiment of housing 12 of FIG. 1. In the illustrated embodiment, housing 12 comprises a first or primary housing portion 20 (FIGS. 2A-2D) configured to receive a first and a second string potentiometer. A second or secondary housing portion 22 (FIGS. 3A and 3B) is configured to removably secure to housing portion 20 and may function substantially as a cover for enclosing housing portion 20.

Referring generally to FIG. 2A, a top view of first housing portion 20 is provided. Housing portion 20 generally comprises a base 21 on which the potentiometers may be placed. A peripheral or circumferential wall 23 may extend from a surface of base 21 and defines interior cavities 25. Each cavity 25 is correspondingly sized to securely accommodate a potentiometer. For example, in one embodiment, each potentiometer comprises a generally cylindrical profile, wherein curved wall portions 24 of peripheral wall 23 are dimensioned to provide a complementary profile to each of the potentiometers. Peripheral wall 23 may have a variable wall thickness, such as to accommodate apertures 29 (e.g. threaded apertures) for engaging with fasteners for securing second housing portion 22 to first housing portion 20. FIG. 2B provides a cross-sectional view of housing portion 20, wherein apertures 16 (e.g. threaded) apertures are formed through a portion of peripheral wall 23. Apertures 16 may be oriented such that fasteners, such as set screws, may be inserted or threaded through peripheral wall 23 via apertures 16, and bear on exteriors of the potentiometers arranged within cavities 25, securing the potentiometers within the housing.

Referring to FIGS. 2C and 2D, housing portion 20 may further comprise apertures 28 (e.g. unthreaded through-holes) configured to receive, for example, fasteners for mounting sensor package 10 to a desired location, such as to a piece of test equipment or to a crash test dummy. Housing portion 20 further comprises slot-like openings or apertures 13, 13' formed through peripheral wall 23 (e.g. in the area of curved wall portions 24). As set forth above, these apertures are oriented to correspond with the location of sensing strings or cables of the potentiometers, thereby allowing the cables to exit the interior of the housing. The width of apertures 13, 13' may be selected such that sensing cables (e.g. cables 15, 15') may articulate over a wide angular range with respect to the potentiometers, without interfering with any portion of the housing. In this way, extreme angles of deformation with respect to the sensor package housing may be accommodated without interfering with the functionality of the sensor.

Figure 3A:
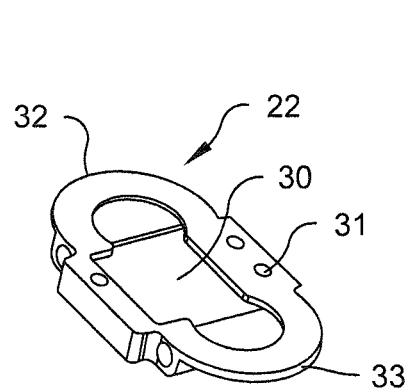
FIG. 3A is a first perspective view of an exemplary second housing portion of a sensor package housing according to an embodiment of the present disclosure.
Figure 3B:
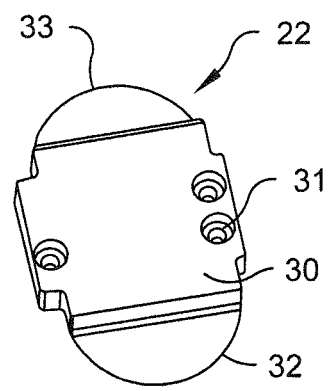
FIG. 3B is a second perspective view of the exemplary sensor package housing portion of FIG. 3A.

Referring generally to FIGS. 3A and 3B, there is illustrated second housing or cover portion 22. Second housing portion 22 comprises a generally planar body 30 having a profile corresponding to peripheral wall 23 of housing portion 20, including respective curved sections 32,33. A plurality of apertures 31 (e.g. unthreaded through-holes) may be formed through body 30. Apertures 31 may correspond in location to apertures 29 of first housing portion 20, such that second housing portion 22 may be removably secured to first housing portion 20 via, for example, a plurality of fasteners (e.g. threaded fasteners). Second housing portion may also comprise apertures 28 corresponding to apertures 28 of first housing portion 20 for mounting the sensor package as desired.

Figure 4:
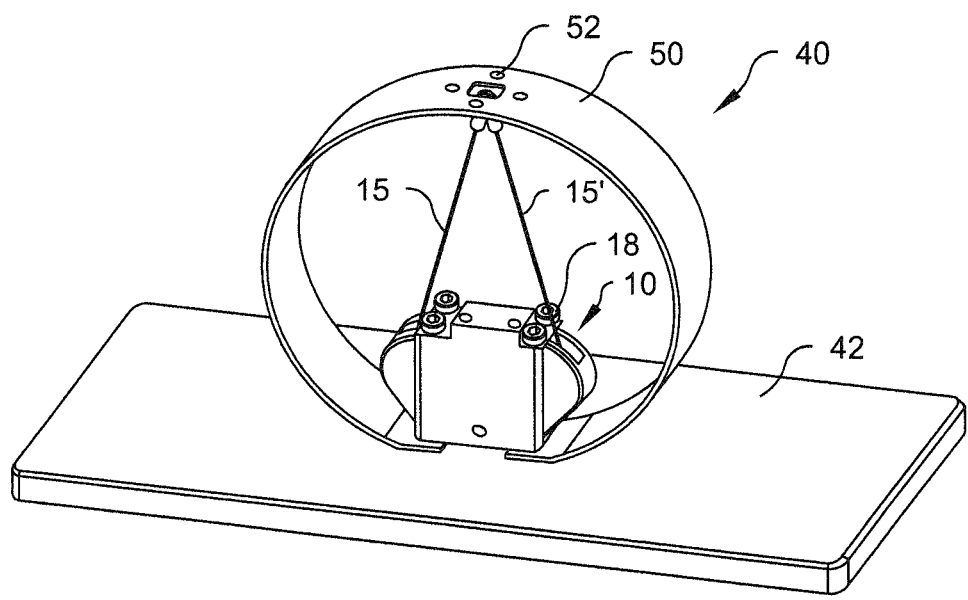
FIG. 4 is a perspective view of the sensor package of FIG. 1, installed within a component rib of a crash test dummy.

FIG. 4 illustrates an exemplary sensor package application 40, including a sensor package 10 installed within an artificial rib 50, such as that used in the above-described WorldSID. As shown, artificial rib 50 comprises a generally ring-shaped element secured to a base 42. Sensor package 10 is configured to measure deformation of artificial rib 50 in at least two dimensions, during, for example, side and offset impact automotive crash testing. As illustrated, sensor package 10 is secured within artificial rib 50 and sensing cables 15, 15' of two potentiometers installed within sensor package 10 are connected to an underside or inside of artificial rib 50 at a common mounting point or deformation measurement location 52. In the exemplary embodiment, sensor package 10 is oriented within artificial rib 50 such that sensing cables 15, 15' and deformation measurement location 52 lie along a plane that substantially bisects a thickness of artificial rib 50. Sensor package 10 is attached to base 42 via, for example, fasteners 18 extending through the housing of package 10. Each potentiometer of sensor package 10 may be powered by, for example a 5V-10V DC power supply (not shown) and is configured to output respective voltage signals indicative of the lengths of sensing cables 15,15' in real time.

Figure 5:
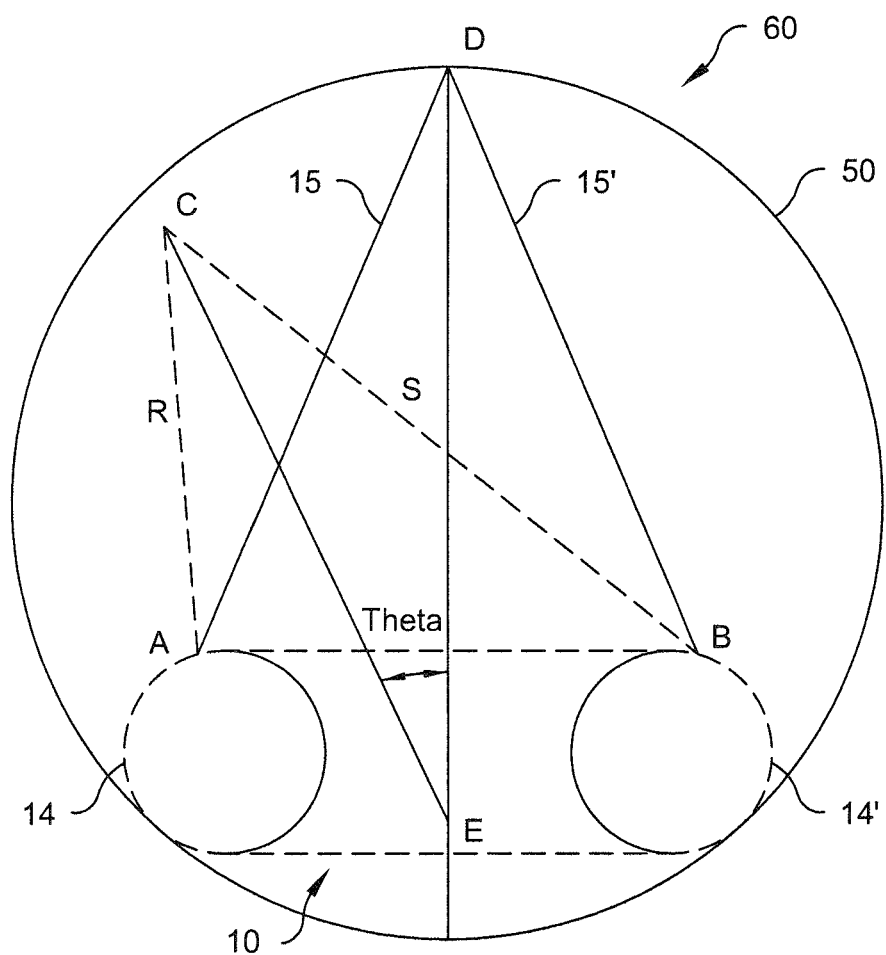
FIG. 5 is a diagram illustrating an exemplary method for calculating two dimensional deformation with a sensor package configured with respect to a component of a crash test dummy.

Referring generally to FIG. 5, a graphical representation 60 of the function of sensor package 10 is shown. As shown, sensor package 10 is mounted within artificial rib 50, as illustrated in FIG. 4. Potentiometers 14, 14' include respective sensing cables 15, 15' (shown in solid) attached to a common deformation measurement location D (i.e. location 52, FIG. 4). Location D corresponds to an initial, unloaded artificial rib state (e.g. an installed state prior to, for example, a crash test). Locations A and B correspond to predetermined reference points representing the orientation of cables 15,15' relative to potentiometers 14,14' and a predetermined reference point or location E, and are based on the design of the potentiometers as well as the housing of sensor package 10. It should be understood that the positions of locations A, B and E are known (i.e. predetermined) for a given housing design. While the position of measurement location D can be determined during a calibration process upon installation of sensor package 10 within artificial rib 50. Accordingly, prior to a deformation event (e.g. a crash test), the positions of locations A, B, D and E are known.

Location C represents the position of deformation measurement location D while the dummy rib is experiencing a deformation event, such as under a force created during a lateral or oblique impact test. It should be understood that the movement from location D to location C occurs generally along the illustrated XY plane. Sensor package 10, along with, for example, associated computer logic (e.g. computer software), are configured to measure and calculate the coordinates of this new location C in the XY plane relative to reference location E. In one embodiment, this calculation is achieved via software utilizing triangulation theories to calculate a distance and deformation angle theta relative to reference location E of the coordinates of the new location C.

Still referring to FIG. 5, an exemplary method used to make real-time calculations of the deformation distance and angle theta of a measurement location is provided below.

Let lines R and S represent the post-deformation length of sensing cables 15, 15', respectively (shown in dashed lines). These lengths can be determined solely by measuring the output voltage of each of the potentiometers 14, 14' in conjunction with calibration data specific to each potentiometer.

As set forth above, the coordinates of $A(X_a,Y_a)$, $B(X_b,Y_b)$, and $E(X_e,Y_e)$ (locations A, B and E) are given based on the design of the device (e.g. the design of the housing and orientation of the potentiometers). The coordinates of $D(X_d, Y_d)$ (location D) can be obtained during set-up of the dummy rib. Applying this information to the following relationships yields the coordinates of $C(X_c,Y_c)$ (post-deformation measurement location C).

L represents the distance between points A and B:

$$L=\sqrt{[(X_b-X_a)^2+(Y_b-Y_a)^2]} \qquad \text{Eq. 1}$$

With $K_1$ representing the slope of line AB:

$$K_1=(Y_b-Y_a)/(X_b-X_a) \qquad \text{Eq. 2}$$

Defining the following intermediate variables as-follows:

$$K_2=-1/K_1 \qquad \text{Eq. 3}$$

$$X_0=X_a+(X_b-X_a)(R^2-S^2+L^2)/2L^2 \qquad \text{Eq. 4}$$

$$Y_0=Y_a+K_1(X_0-X_a), \text{ and} \qquad \text{Eq. 5}$$

$$R_2=R^2-(X_0-X_a)^2-(Y_0-Y_a)^2 \qquad \text{Eq. 6}$$

The coordinates of point C are derived by:

$$X_c=X_0-\sqrt{[R_2/(1+K_1^2)]} \qquad \text{Eq. 7}$$

$$Y_c=Y_0+K_2(X_c-X_0) \qquad \text{Eq. 8}$$

The distance $L_{ce}$ between points C and E can be calculated:

$$L_{ce}=\sqrt{[(X_c-X_e)^2+(Y_c-Y_e)^2]} \qquad \text{Eq. 9}$$

The slopes of lines CE and DE are derived by:

$$\tan(CE)=(Y_c-Y_e)/(X_c-X_e) \qquad \text{Eq. 10}$$

$$\tan(DE)=(Y_d-Y_e)/(X_d-X_e) \qquad \text{Eq. 11}$$

Finally, the angle "theta" between lines CE and DE can be determined by:

$$\text{Theta}=\tan^{-1}[(\tan(CE)-\tan(DE))/(1+\tan(CE)*\tan(DE))] \qquad \text{Eq. 12}$$

Accordingly, embodiments of the present disclosure utilize the linear measurements of first and second potentiometers, along with triangulation theories, to calculate the position of a measurement location of an object under deformation in real time. The above calculations may be embodied as a set of instructions to be performed by, for example, a processor of a computer. The computer may be operatively connected to the outputs of the potentiometers, as well as have access to data pertaining to the known locations of A, B and E. Calibration data for determining a location of point D after the sensor package has been installed within the artificial rib may also be input into the computer for use in the above calculations.

Figure 6:
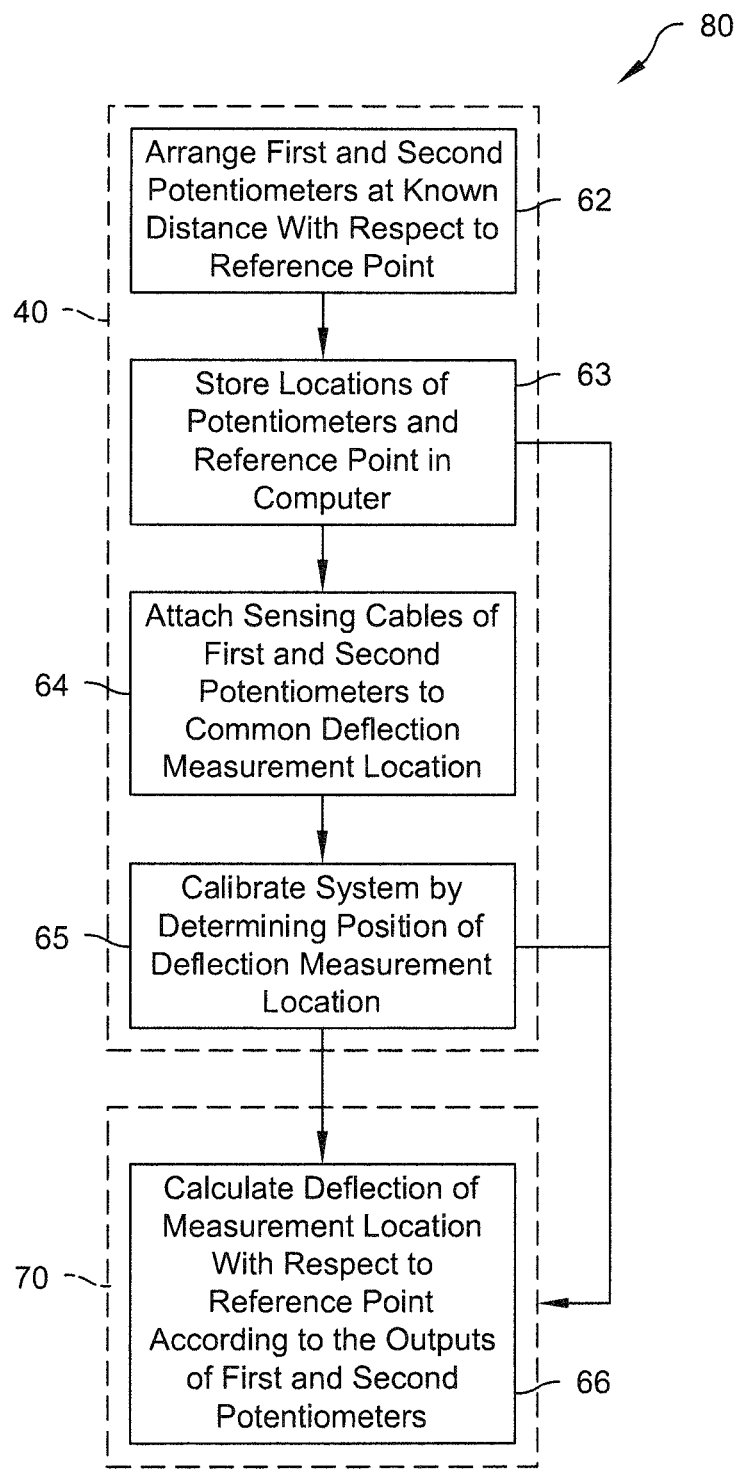
FIG. 6 is a process flow diagram of an exemplary method of calculating deformation using a sensor package according to embodiments of the present disclosure.

FIG. 6 is a process diagram illustrating an exemplary method 80 for measuring deformation according to an embodiment of the present disclosure. This method may be used to perform deformation measurements in, for example, sensor package application 40 as illustrated in FIG. 4. In a first step 62 first and second potentiometers are arranged a known distance from a common reference point. This may be achieved by, for example, arranging first and second potentiometers within a housing, wherein the location of the reference point and the location of the first and second potentiometers are known, and can be input into (e.g. stored in the memory of), for example, a computer 70 in step 63. In step 64, the sensing cables or sensing ends of the first and second potentiometers are each attached to a common deformation measurement location on the object for which deformation is to be measured (e.g. a dummy rib). Once attached, a calibration step 65 may be performed, in which, based on the output of the potentiometers, the position of common deformation measurement location (i.e. location D) may be determined by computer 70. During a deformation event caused by the application of force on the object, the outputs of each of the potentiometers are continuously input to computer 70, wherein a measurement of deformation (e.g. a linear component and an angular component) with respect to the reference point may be calculated according to the above-described methods based on the outputs of the potentiometers in step 66.

While embodiments of the deformation sensors according to the present disclosure have been described for use in a rib deformation application, it should be understood that embodiments can be used in any application that requires two dimensional position measurements in a confined space. Other exemplary applications include, but are not limited to, robotic motion control, factory machine automation and traffic accident reconstruction.

The computers described herein, such as computer 70, may include one or more processors and memory containing data, which may include instructions, the instructions when executed by a processor or multiple processors, cause the steps of a method for calculating deformation as described herein. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A deformation sensor package comprising:
a housing including:
a base and a peripheral wall extending from the base, the base and peripheral wall defining two cavities, each configured to receive an associated string potentiometer,
wherein the peripheral wall defines two apertures formed between a respective cavity and an exterior of the housing, and wherein each aperture is configured to allow for the passage of a moveable sensing end of a sensing cable of an associated string potentiometer through the aperture.

2. The deformation sensor package of claim 1, wherein the housing comprises a first housing portion including the base and the peripheral wall and a second housing portion comprising a removable cover for selective enclosing the cavities within the housing.

3. The deformation sensor package of claim 1, further comprising first and second string potentiometers arranged in a respective one of the cavities defined in the housing.

4. A deformation sensor package comprising:
a housing including:
a base and a peripheral wall extending from the base, the base and peripheral wall defining a first cavity and a second cavity;
a first string potentiometer having a first sensing cable arranged in the first cavity; and
a second string potentiometer having a second sensing cable arranged in the second cavity;
wherein the peripheral wall defines two apertures formed between a respective cavity and an exterior of the housing, and wherein a moveable sensing end of each of the first and second sensing cables is arranged through a respective one of the two apertures.

5. The deformation sensor package of claim 4, wherein the apertures are sized and oriented such that the sensing cables of the first and second string potentiometers may be attached to a common mounting point on an object for which deformation is to be measured.

6. A system for measuring the deformation of an artificial rib of a crash test dummy comprising:
a sensor package including:
a first string potentiometer and a second string potentiometer, each potentiometer comprising a moveable sensing cable; and
a sensor support structure for positioning first and second potentiometers at a given distance from a reference point;

an artificial rib of a crash test dummy; and a processor responsive to outputs of the first and second string potentiometers and configured to measure deformation in response to a force applied to the artificial rib, wherein each sensing cable of the first and second string potentiometers is attached on a free end thereof to a common deformation measurement location on the artificial rib.

7. The system of claim 6, further comprising a memory device, the memory device containing data indicative of the locations of the first and second potentiometers with respect to the reference point.

8. The system of claim 6, wherein the artificial rib comprises a ring-shaped element.

9. The system of claim 8, wherein the sensor support structure is arranged within the artificial rib and the sensing cables of the first and second potentiometers are attached to a common deformation measurement location positioned on an interior side of the artificial rib.

10. The system of claim 6, wherein the sensor support structure comprises a housing.

11. The system of claim 10, wherein an exterior wall of the housing comprises apertures formed therethrough, the apertures configured to allow for the passage of the sensing cables of each potentiometer.

12. The system of claim 6, further comprising a base, wherein the sensor support structure and the artificial rib are mounted to the base.

13. A method of measuring the deformation of an object with respect to a reference point in at least two dimensions, the method comprising:

arranging first and second string potentiometers at a given distance with respect to a reference point, each string potentiometer comprising a sensing cable having a moveable sensing end;

attaching each of the moveable sensing ends of the first and the second potentiometers to a common deformation measurement location on the object;

determining, in response to a force applied to the object, deformation of the deformation measurement location with respect to the reference point according to the output of the first and second string potentiometers.

14. A method of claim 13, wherein the step of arranging the first and second potentiometers includes arranging the first and second potentiometers in a housing.

15. A method of measuring the deformation of an object with respect to a reference point in at least two dimensions, the method comprising:

arranging first and second potentiometers at a given distance with respect to a reference point;

attaching moveable sensing ends of the first and the second potentiometers to a common deformation measurement location on the object; and determining, in response to a force applied to the object, deformation of the deformation measurement location with respect to the reference point according to the output of the first and second potentiometers, wherein the step of determining deformation of the deformation measurement location with respect to the reference point includes determining the position of the deformation measurement location with respect to the reference point prior to the application of force causing the deformation, and determining the position of the deformation measurement location with respect to the reference point after the application of force causing the deformation.

16. The method of claim 15, wherein the step of determining deformation of the deformation measurement location with respect to the reference point includes determining a linear deformation component and an angular deformation component with respect to the reference point.

17. The method of claim 13, further comprising the step of storing the position of the first and second potentiometers with respect to the reference point in the memory of a computer.

18. The method of claim 17, further comprising the step of storing the position of the common measurement location in the computer according to the output of the first and second potentiometers prior to the application of force causing the deformation.

* * * * *